United States Patent [19]

Robinson

[11] Patent Number: 4,920,418
[45] Date of Patent: Apr. 24, 1990

[54] IMAGING SYSTEM HAVING A SWING-DRIVEN IMAGE SENSOR

[75] Inventor: Christopher P. Robinson, Shepton Mallet, United Kingdom

[73] Assignee: GEC-Marconi Limited, Stanmore, United Kingdom

[21] Appl. No.: 186,268

[22] Filed: Apr. 26, 1988

[30] Foreign Application Priority Data

Apr. 27, 1987 [GB] United Kingdom ................. 8709916

[51] Int. Cl.⁵ .............................................. H04N 3/14
[52] U.S. Cl. ............................ 358/213.28; 358/213.13
[58] Field of Search ...................... 358/213.13, 213.28, 358/213.11, 212, 209; 250/578

[56] References Cited

U.S. PATENT DOCUMENTS

| | | | |
|---|---|---|---|
| 4,535,363 | 8/1985 | Harada et al. | 358/213.13 |
| 4,554,586 | 11/1985 | Tanuma et al. | 358/212 |
| 4,595,954 | 6/1986 | Endo et al. | 358/213.28 |
| 4,612,581 | 9/1986 | Endo et al. | 358/213.28 |
| 4,633,317 | 12/1986 | Uwira et al. | 358/213.28 |
| 4,634,884 | 1/1987 | Hayashimoto et al. | 358/213.28 |
| 4,652,928 | 3/1987 | Endo et al. | 358/213.28 |

FOREIGN PATENT DOCUMENTS

| | | |
|---|---|---|
| 0083240 | 7/1983 | European Pat. Off. . |
| 120678 | 10/1984 | European Pat. Off. . |
| 0127277 | 12/1984 | European Pat. Off. . |
| 131387 | 1/1985 | European Pat. Off. . |
| 53-101939 | 9/1978 | Japan ............................... 358/213.28 |
| 1315261 | 5/1973 | United Kingdom . |
| 2152781 | 8/1985 | United Kingdom . |

Primary Examiner—Jin F. Ng
Assistant Examiner—Stephen Brinich
Attorney, Agent, or Firm—Spencer & Frank

[57] ABSTRACT

An imaging system, which improves the optical revolution and reduces optical alias of a solid state imager comprises a lens and a modulating element, which alters incident radiation in such a manner as to displace the image by fractions of a pixel between adjacent fields by either mechanically shifting the elements or by electro-optic variations of refractive index. A processing system is also provided, in which alternate fields are interlaced and output to a monitor. The modulator is arranged in a demountable manner, so that it can be "bolted on" as an additional attachment to a standard camera. The processing system is attached via the original CCD output terminal.

11 Claims, 6 Drawing Sheets

FIG. 3a) THE C.C.D. SENSES AND SAMPLES THE FIRST FIELD OF THE IMAGE

FIG. 3b) SIGNAL AFTER CHOPPING AND SAMPLING

FIG. 3c) THE C.C.D. SENSES AND SAMPLES THE SECOND FIELD OF THE IMAGE

FIG. 3d) SIGNAL AFTER CHOPPING AND SAMPLING

FIG. 3e) SIGNAL PERCEIVED BY THE HUMAN EYE

IMAGING SYSTEM HAVING A SWING-DRIVEN IMAGE SENSOR

BACKGROUND OF INVENTION

1. Field of Invention

This invention relates to an imaging system and in particular it relates to apparatus for improving the resolution and reducing the optical alias of imaging systems which include a solid state image sensor such as a CCD sensor.

2. Description of the Prior Art

In a conventional scanned imaging system using a solid state sensor, electromagnetic radiation, generally either optical or infra red is admitted by a lens system to an array of imaging elements which may be charge coupled devices (CCD's). The CCD array is scanned and an output is taken from each element in turn which is dependant upon the light incident upon that element. This output is processed and used to modulate the display on a monitor and thus to produce an image upon the monitor. The resolution of such a system is dependant upon the size and number of the CCD elements within the sensing array. Current technology limits this size to a sensor of a maximum of perhaps 600×600 elements each of around 10 micron dimensions.

An image is generally viewed over two scanning fields. In the first field the 1st, 3rd, 5th etc. lines of the array are scanned and during the second field the 2nd, 4th etc. lines are scanned. The processing system then interlaces the two fields upon a display monitor and the human eye and brain performs an integrating function to see the entire image. Typically the scanning time for one field is 50 Hz and thus the whole picture is refreshed with a frequency of 25 Hz.

In order to improve the resolution of such a system, it has been suggested to shift the image position with respect to the sensor by half a pixel or integer and a half pixel during each alternate field. If the shift is made in the horizontal direction then the horizontal resolution of such a system can be effectively doubled since the slight shifting of the image tends to effectively half the length of an imaging element and thus to double the total number of elements which are apparently used to view each horizontal line of the image. In order that the picture does not flicker on the monitor it is important that, after sensing, the video signals are shifted back by half pixel or integer and one and a half times in synchronism with the shift of the image. It has been suggested to shift the image either by altering the position of the CCD slightly or to alter the angle of a glass plate or mirror placed between the lens and imaging sensor. The present invention arose from a need to maintain the resolution increase whilst also reducing the degrading effects of aliassing. Also, it was required to provide a system which can use a standard CCD camera.

SUMMARY OF THE INVENTION

According to the present invention there is provided an imaging system comprising an array of solid state imaging elements adapted to be sampled sequentially at a pixel rate; means for optically shifting an image relative to a sensor in adjacent time integration periods; means for processing the received information such that it remains spatially co-incident in adjacent time periods, and; secondary sampling means for sampling a portion of the received information at a sampling rate synchronous to the pixel rate.

The adjacent time integration periods may be fields or frames of a T.V. picture and the image may be shifted by half a pixel pitch or integer and one and a half times the pixel pitch in adjacent T.V. fields.

The secondary sampling means may be adapted such that the sampling sites for display or further processing are adjacent in each integration period, i.e. when two fields are interlaced to form a T.V. image the sampling sites form a "checker board" type of display.

The imaging sensor may comprise a CCD array.

The invention thus not only improves the resolution of an imaging system but also reduces the optical alias of the sensors. By virtue of its sampling action the solid state image sensor produces an alias in both vertical and horizontal senses. The method according to the invention enables a reduction in this alias to be realised.

Although generally the image will be shifted in the horizontal direction it could also be shifted in the vertical direction or in a combination of both directions. The image shifting element may be a glass block or mirror placed between a lens and the imaging sensor.

In one embodiment modulation is performed by means of piezo-electic bimorphs. Such bimorphs are well known and can provide a fast controllable degree of oscillation. For currently available CCD arrays, the photodetector pitch is in the range 7.5 to 22 microns, so the half pixel image displacement required is in the region of 4 to 11 microns. Assuming a 5 micron shift is required, from a glass block of 5 mm thickness the angular rotation required is around 2 milliradians and this can be controllably achieved by using piezo-electric bimorphs in the manner further described below.

Alternatively, the element may be of a material whose refractive index n, or another parameter, can be changed under the influence of an electric or magnetic field. In such a case, electro-optic means are provided to alter n, and hence displace the image, between fields.

The resampling may be achieved by using a chopping modulator sampling only a portion of the received output from each array element and blanking the remainder of the output.

Alternatively, resampling may be achieved by digital methods using a field store with appropriate delays built in.

Embodiments of the invention will now be described by way of example only with reference to the accompanying drawings in which;

DESCRIPTION OF THE PREFERRED EMBODIMENT

Figure 1:
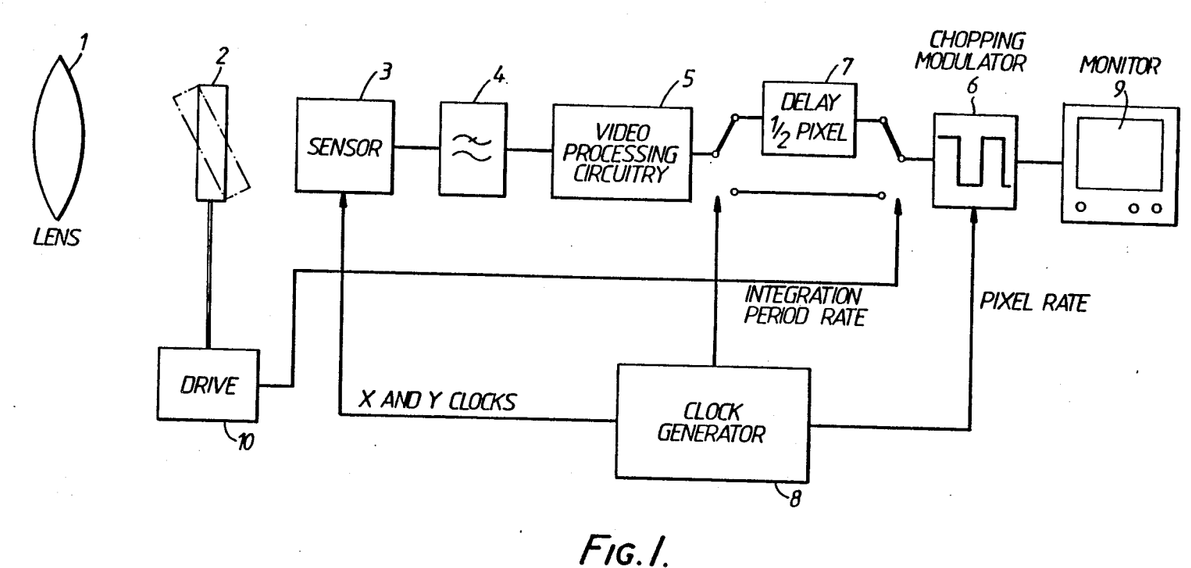
FIG. 1 shows schematically apparatus according to the invention.

Referring to FIG. 1, in an optical imaging system a lens 1 is arranged to direct radiation, generally either optical or infra-red, through a glass plate 2 to an imaging sensor 3. The sensor comprises an array of CCD imaging elements, typically a 600×600 array. A signal output from sensor 3 is filtered by a low pass filter 4 and directed to standard video processing circuitry 5. The output from this is directed either directly to a chopping modulator 6 or indirectly to the chopping modulator by means of a half pixel delay line 7. The chopping modulator 6 is synchronised with clocking signals serving a scanning function for reading the ouputs of the sensor elements 3 by means of a clock generator 8. The output from the chopping modulator is displayed on the monitor 9, or alternatively may be used for further processing as desired. The glass plate 2 is arranged to be tilted slightly and go back and forth by a driver 10 at a rate synchronous with the integration period rate of the sensor, i.e. with the field rate of the system.

The system is thus basically a standard CCD element imaging system with the further addition of an image shifting means 2, a switchable delay 7 and chopping modulator 6. The imaging sensor 3 is driven at a rate determined by the clock generator 8 such that it scans an image fieldwise; i.e. in a first field lines 1, 3, 5 etc of an image are scanned and in a second field lines 2, 4 etc are scanned. The complete image frame is made up by interlacing the two received fields. A typical frame rate is 25 Hz.

Figure 2A:
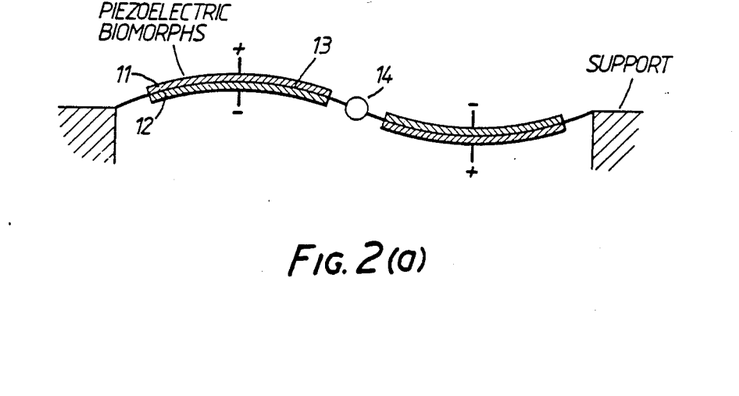
FIGS. 2a–2b show two alternative methods of mounting the glass plate on piezo-electric bimorphs.
Figure 2B:
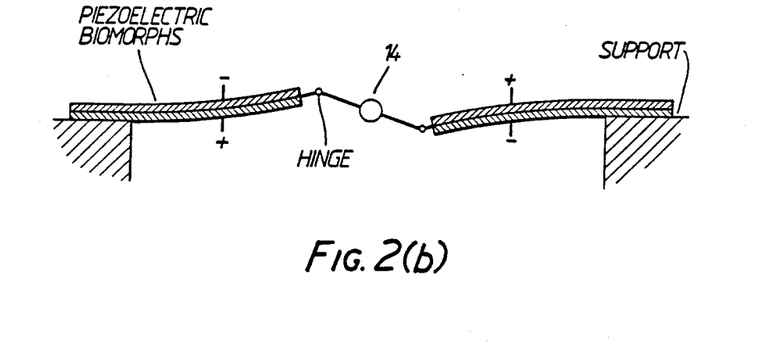

The glass plates 2 may conveniently by tilted by means of piezo-electric bimorphs, as shown in FIGS. 2a and 2b. A piezo-electric bimorph comprises two piezo-electric sheets 11 and 12 bonded onto respective sides of a thin metal plate 13. The polarisation of the plates is arranged so that one plate contracts when a voltage is applied and the other expands. This tends to bend the bimorph into an arc of a circle. Two different methods of using such bimorphs are shown in the figures. In FIG. 2a four bimorphs are connected to respective corners of an axle 14 which lies in a plane perpendicular to the paper. The glass block is mounted transversely along the axle. Thus, by applying the voltages as shown to the bimorphs the angle of the axle and hence the glass block 3 is controllably altered, dependant upon the voltage applied. By reversing the applied voltage the angle is reversed. FIG. 2b shows an alternative embodiment wherein the bimorphs are connected to the axle by means of hinges.

Figure 3A:
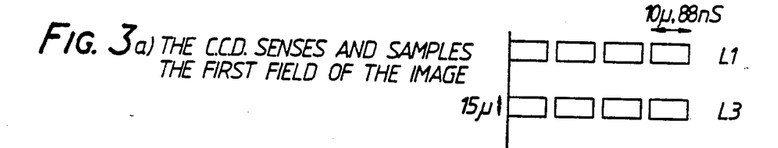
FIGS. 3a–3e show representative outputs from the system.
Figure 3B:
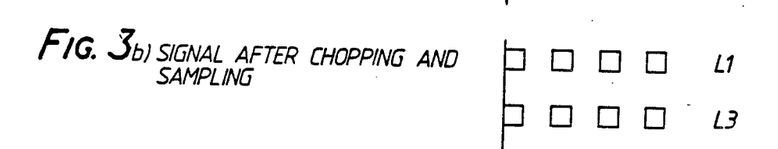

The use of the apparatus of FIG. 1 will now be described. During receipt of the first field of the image the sensor 3 is clocked by generator 8 at its normal clocking rate. The glass plate for the first field is situated at one particular angle shown by the solid line on the figure. After low pass filtering, standard video processing and further filtering is applied within box 5. The processed video signals are then sent sequentially direct to chopping modulator 6 which is arranged as a square wave of frequency 11.25 MHz. This is equal to the pixel rate determined by clock generator 8 which is used to sequentially sample the relevant elements of the imaging sensor 3. Thus, since a chopping modulator is a square wave of approximately 50% duty cycle, then, in effect, half of the received output from each array element is blanked out. This effect is shown more clearly in FIGS. 3a and b where in FIG. 3a signals arriving at the input of the chopping modulator are shown and these are spatially representative of the array element configuration. After chopping, the position of FIG. 3b is reached in which half the signals are allowed to continue unmodulated and half are in effect blanked out. The thus received field is displayed on monitor 9 or used for any further processing which is desired.

Figure 3C:
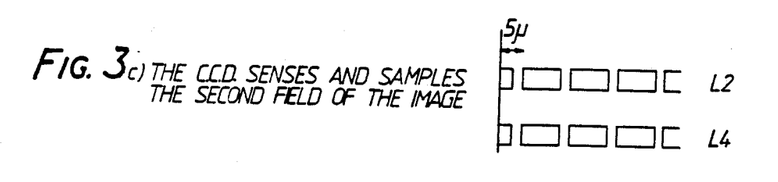
Figure 3D:
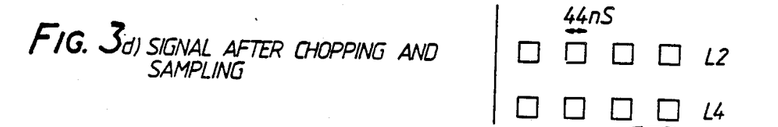
Figure 3E:
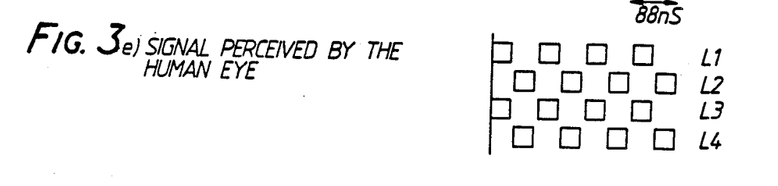

After the first field has been received then the glass block is tilted by means of the bimorphs to a second position shown by the dotted lines of FIG. 1. It will be appreciated that this tilting has the effect of displacing the image slightly relative to the sensor elements. It is arranged such that the image is displaced by half a pixel or by integer and half times. The displaced image is then scanned by the sensor, sent through the same processing circuitry 4 and 5 and switchably fed to a delay line 7. This serves to delay the video by half a pixel for the reasons outlined above and so as to maintain the picture position constant on the monitor. The delay line may be external to the basic video camera and infact in embodiments of the invention all the non-standard parts of the system may be external to a standard camera and thus the system is easily implementable without requiring modification of a camera. After passing through the delay line the video for the second field is secondary sampled by chopping modulator 6 and fed to monitor 9. FIG. 3c shows the signals received by the system relative to the object after the action of delay line 7. FIG. 3d shows the same signals after secondary sampling or chopping at modulator 6. The second field is then displayed on the monitor. The effective picture actually seen on the monitor is as shown in FIG. 3e since the eye tends to retain images for relatively long periods and thus sees both fields together interlaced in the manner shown in FIG. 3e. The eye thus performs an integration function and it is seen that a high resolution picture is obtained. An unchopped signal would cause blurring between adjacent pixel elements.

The chopping modulator should run at pixel rate and be synchronised to the pixel readout rate. This may also be external to the camera.

Figure 4:
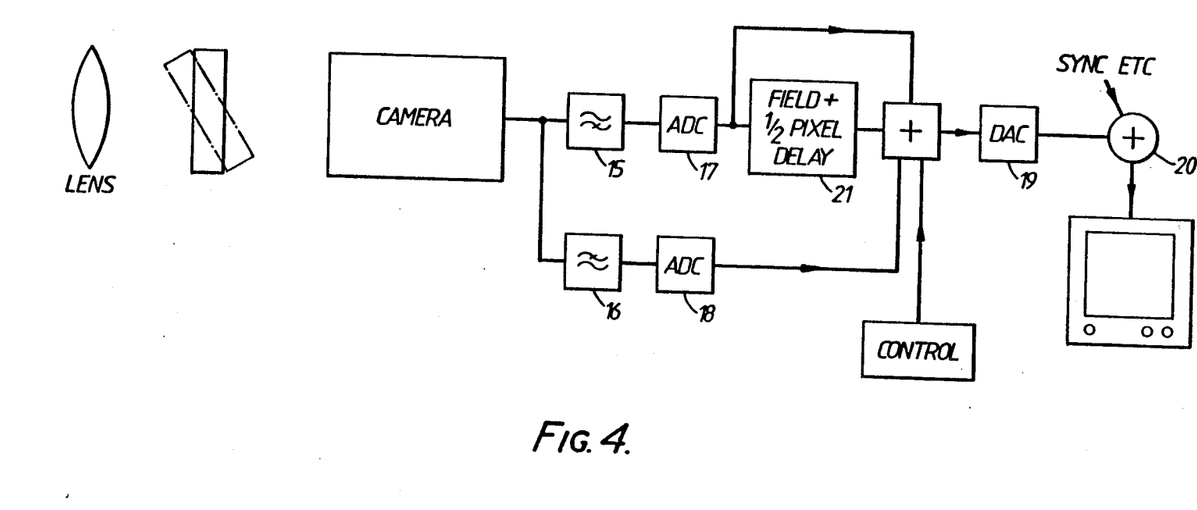
FIG. 4 shows an alternative embodiment involving digital techniques.

FIG. 4 shows an alternative embodiment in which signals received from the video camera, which includes imaging sensor 3 and processing circuitry 4 and 5, are split into high and low frequency components by filters 15 and 16 respectively and digitised by ADC's 17 and 18. During receipt of the first field, signals representative of the high frequency component of each pixel element are sampled such that a sample equal to half the length of each pixel element is stored in every other memory location of one of two field stores forming a frame store 19. As each signal is sequentially received the sampled portion of it is stored in every other memory element of that field store. During receipt of a second field, the image of which has been shifted with respect to the sensor by the glass block, each received pixel element is sequentially sampled as for the first field and is placed in the empty locations of the first field store such that after receipt of the complete field, that field store is filled with, alternatively, data representative of respectively the first field and second field. The whole resulting frame is then sent out from the field store where it is mixed with the low frequency component of the second, i.e. current, field. The whole recovered signal is then reconverted to analogue form in a digital to analogue converter 19. Sync signals, etc. are added at unit 20 and the video signal subsequently displayed. The displayed video signal is thus as shown in FIG. 3e except that all the picture elements are in effect moved up one row i.e., the elements shown as $L_1$ are moved down to the second line $L_2$ and fill the gaps between the elements in line $L_2$. Since there are two field stores present in a frame store, while each field store is being read out a second field store is being filled and thus the third line of the video display will show that information currently in line $L_3$ of FIG. 3e interlaced with the information currently in $L_2$. Similarly the fourth line will contain the information currently in the fourth line interlaced with that currently in the third line. i.e. the overall effect is of vertical bars each of two lines in the vertical dimension and one square of horizontal dimension. Hence, the increase in resolution and also the reduction in aliassing is maintained. The picture actually seen by the eye is the same as that for the first embodiment since the eye itself performs the vertical integration function over adjacent pixels in the first embodiment.

The low frequency output from the camera is not processed by the field store since the vertical resolution is effected by low frequency information and processing the LF information would tend to degrade vertical resolution. The use of digital techniques considerably reduces the performance requirements of the monitor and also all the digital apparatus may be external to the camera, thus can in effect be a "bolt on" addition to a standard camera.

Figure 5:
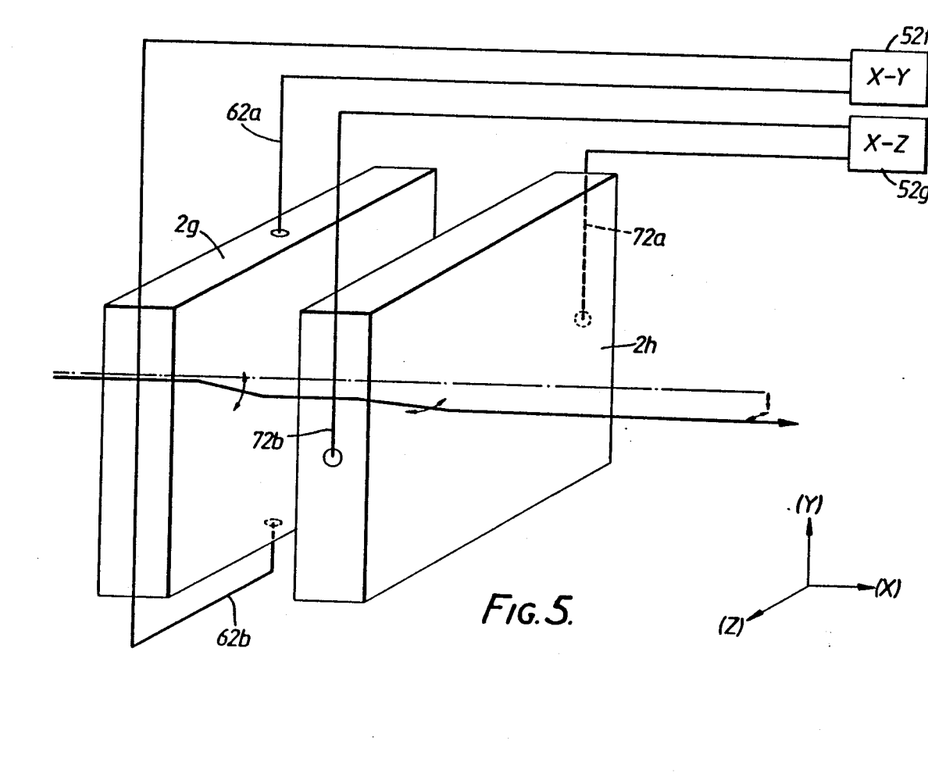
FIG. 5 shows an optical shifting arrangement.
Figure 6:
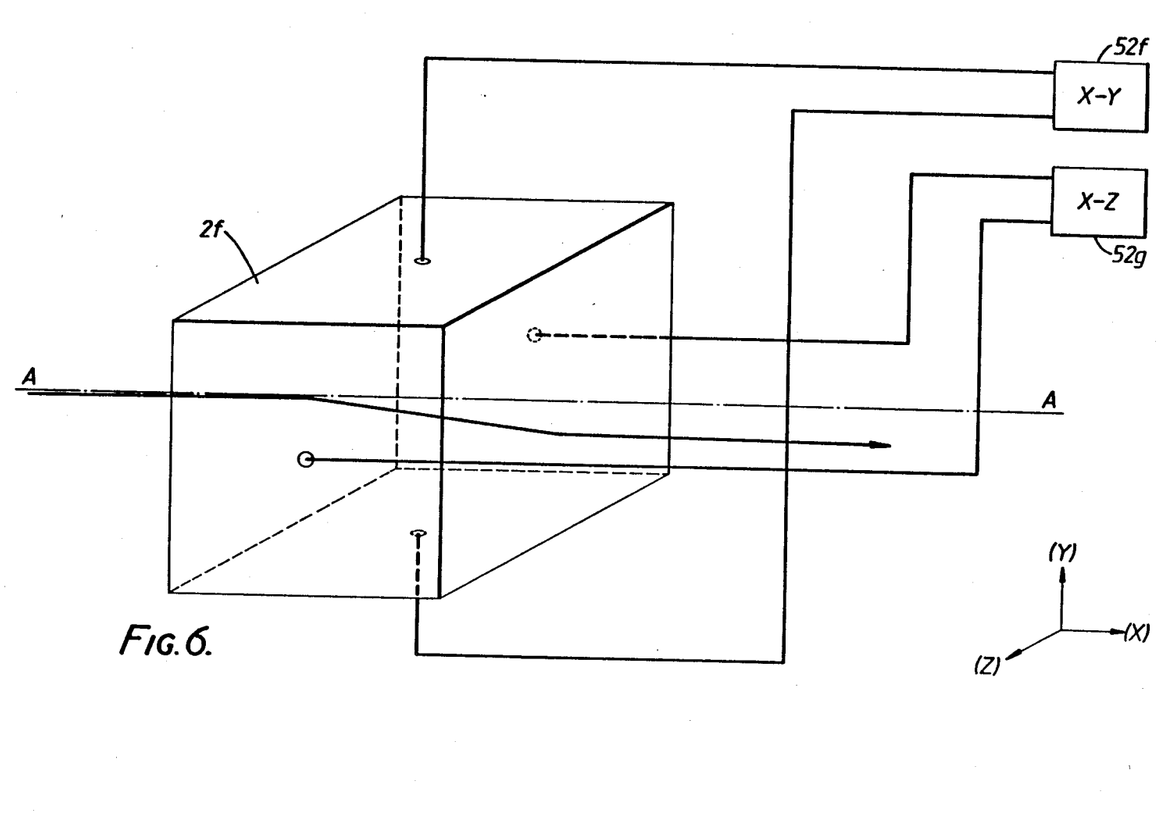
FIG. 6 shows an alternative optical shifting arrangement.

In further embodiments, shown in FIGS. 5 and 6, the image shifting is performed by changing a physical property of the refracting glass block, mirror or lens. For example by imposing an altering electrical field across at least two faces of the block.

Preferably the modulation of incident radiation in such an embodiment is characterised by the altering of the refractive index of the transparent glass, typically by an alternating voltage. An example of such a material is Cadmium Mercury Telluride (CMT). This is a "glass" which is transparent to a broad waveband of light. The inherent advantage of using such an optical shifting system is that it is faster, more reliable, more responsive and less likely to suffer "wear-and-tear" damage. This final point is especially important when considering, not so much the block, but the modulating means and its attachments.

FIG. 5 shows two substantially parallel blocks of transparent Cadmium Mercury Telluride (CMT) (2g and 2h). Attached to each of these blocks are electrodes 62a, 62b, 72a and 72b respectively. A first modulation controller 52f modulates the refractive index across two faces, thereby refracting radiation in one plane, whilst a second modulation controller, 52g varies the refractive index in a different sense and thereby refracts radiation in a different plane. In the preferred embodiment the two planes are orthogonal.

FIG. 6 shows a single block (2f) arranged to modulate in two orthogonal planes, the control of said modulation being performed by controllers 52f and 52g Apparatus according to the present invention may be used with any convenient type of solid state imager or self scan imagers such as staring arrays.

Certain types of infra-red imagers require a thermal difference in detected radiation in order to function correctly. The action of the image shifting device 2 of the present invention may be used to provide this radiant difference for the sensor.

I claim:

1. An imaging system comprising:
   an array of solid state imaging elements for producing an image signal corresponding to an optical input to said imaging elements;
   means for optically shifting said optical input out of spacial coincidence, in synchronism with a pixel rate so that the image signal produced by said array is out of spacial coincidence;
   primary sampling means for sequentially sampling the out of coincidence image signal from said imaging elements at a pixel rate to produce an out of spacial coincidence field signal;
   means for processing the out of coincidence field signal to produce a video signal for display of said field signal in spatial coincidence, representative of the optical input;
   and secondary sampling means for sampling the video signal at a rate synchronous to said pixel rate, including a chopping modulator for generating a square waveform synchronous to said pixel rate wherein said video signal is sampled by said secondary sampling means during every other half cycle of said waveform.

2. An imaging system as claimed in claim 1 wherein said means for optically shifting the image includes an element having a refractive index, and means for oscillating said element in synchronism with said pixel rate to shift the optical input.

3. An imaging system as claimed in claim 2 wherein the element is mounted by means of piezo-electric bimorphs.

4. An imaging system as claimed in claim 1 wherein said means for optically shifting includes an optical element having a refractive index, and electro-optic means for modulating said refractive index to shift said optical input.

5. An imaging system as claimed in claim 4 including means for providing at least one potential field across the optical element and means for switching the field between two states.

6. An imaging system as claimed in claim 4 wherein the element is of cadmium mercury telluride.

7. An imaging system comprising:
   an array of solid state imaging elements for producing an image signal corresponding to an optical input to said imaging elements;
   means for optically shifting said optical input out of spacial coincidence, in synchronism with a pixel rate so that the image signal produced by said array is out of spacial coincidence;
   primary sampling means for sequentially sampling the out of coincidence image signal from said imaging elements at a pixel rate to produce an out of spacial coincidence field signal;
   digital storage means including means for processing the out of coincidence field signal to produce a video signal for display of said field signal in spacial coincidence, and secondary sampling means for sampling the video signal at a rate synchronous to said pixel rate.

8. An imaging system as claimed in claim 7 wherein:
   said field signal has a high frequency component and a low frequency component,
   the high frequency component of said field signal is processed by said storage means and
   the low frequency component is removed from said field signal and added to the processed high frequency component after storage.

9. An imaging system as claimed in claim 8 wherein said means for optically shifting the image includes an element having a refractive index, and means for oscillating said element in synchronism with said pixel rate to shift said optical input.

10. Imaging apparatus for use with a video camera of the type including a solid state sensor for sensing radiation impinging thereon, comprising:
    means for optically shifting the radiation before it impinges upon the sensor so as to shift an image relative to the sensor between adjacent time integration periods;
    means for processing a signal output from the camera such that said signal is restored to spatial coincidence in adjacent time periods; and
    means for sampling a portion of the processed signal at a sampling rate synchronous to a pixel rate;
    wherein the imaging apparatus is demountable from the camera.

11. An imaging system comprising:
    an array of solid state imaging elements for producing an image signal corresponding to an optical image input;
    means for optically shifting said optical image input between a first optical position and a second optical position out of spacial coincidence wit said first position, in synchronism with a pixel rate,
    means for sequentially sampling said image signal from said image elements at said pixel rate, and for producing a first field signal from said image signal corresponding to said first optical position and a second field signal from said image signal corresponding to said second optical position;
    means for combining said first and second field signals to produce a video signal representative of said first and second field signals combined in spacial coincidence; and
    secondary sampling means including a chopping modulator adapted to generate a square wave waveform, for sampling said video signal during every other half cycle of said waveform at a rate synchronous to said pixel rate.

* * * * *